| United States Patent [19] | [11] Patent Number: 4,759,984 |
|---|---|
| Hwo | [45] Date of Patent: Jul. 26, 1988 |

[54] PEELABLE SEALS USING POLYBUTYLENE-1

[75] Inventor: Charles C. Hwo, Sugarland, Tex.

[73] Assignee: Shell Oil Company, Houston, Tex.

[21] Appl. No.: 879,667

[22] Filed: Jun. 27, 1986

[51] Int. Cl.$^4$ .......................... C09J 7/02; B32B 27/08; B32B 27/34; B32B 27/36

[52] U.S. Cl. .................................... 428/349; 428/355; 428/412; 428/475.5; 428/475.8; 428/476.1; 428/913

[58] Field of Search ................. 428/474.4, 476.1, 516, 428/216, 913, 412, 355, 349, 475.8, 475.5; 525/221, 222, 240; 526/68; 156/327

[56] References Cited

U.S. PATENT DOCUMENTS

| 3,362,940 | 1/1968 | Edwards et al. | 526/68 |
|---|---|---|---|
| 3,817,821 | 6/1974 | Gallini | 428/216 |
| 3,879,492 | 4/1975 | Bostiaick | 523/100 |
| 4,075,290 | 2/1978 | Denzel et al. | 525/240 |
| 4,189,519 | 2/1980 | Ticknor | 428/476.1 |
| 4,414,053 | 11/1983 | Karim et al. | 156/327 X |
| 4,539,263 | 9/1985 | Hoh | 428/516 X |
| 4,550,141 | 10/1985 | Hoh | 525/221 |
| 4,665,130 | 5/1987 | Hwo | 525/222 |

*Primary Examiner*—Thomas J. Herbert
*Attorney, Agent, or Firm*—Wendy K. B. Buskop

[57] ABSTRACT

A composition of matter or a film for producing a peelable heat seal between substrates on which it is carried, comprising a blend of:
 (a) about 6 to about 25 weight percent of polybutylene having a melt index of about 0.1 to about 500;
 (b) about 75 to about 92 weight percent of modified EVA or modified low density polyethylene; and
 (c) about 2 to about 15 weight percent of polypropylene; and wherein said blends are coated onto either nylon or polycarbonate.

18 Claims, No Drawings

PEELABLE SEALS USING POLYBUTYLENE-1

BACKGROUND OF THE INVENTION

A highly conventional and widely used method of packaging utilizes a synthetic resinous film, which is disposed about the produce and heat sealed to enclose it therewithin. In many instances, it is desirable to open the package by peeling apart the sealed films, and this must generally be done without destroying the integrity of the film itself. Accordingly, to provide a satisfactory package of this type, a balance of properties is necessary, i.e. the seal strength must be adequate to maintain the package in a closed and protective condition, while also exhibiting release properties as will permit opening by peeling when desired.

The invention relates to blends, and a method for making the blend of a flexible film package made from films and/or laminates. Seals produced from these heat-sealable films and/or laminates are characterized by a nearly constant peel strength over an extended heat seal temperature range and by being peelable. The term "peelable" refers to a film having seal failure occur primarily at the interface of the sealing surfaces, rather than film tearing. The blends, films and/or laminates of the present invention permit the manufacture of a more consistent finished product, having a seal of predictable and constant peel strength, in spite of inevitable variations in the heat seal temperatures used in the production of such packages.

U.S. Pat. No. 4,189,519 describes one such heat sealable resin blend. This reference teaches that a resin blend comprised of at least two components, about 50 to 90 weight percent of a copolymer of about 80 to 96 weight percent of ethylene and about 4 to 20 weight percent of an ethylenically unsaturated ester, and about 50 to 10 weight percent polybutylene (preferably high molecular weight polybutylene), produces a peelable seal with a heat sealing temperature of about 160°-300° F., and affords a peel strength of about 0.3 to 3 pounds per square inch.

This same reference also teaches that the copolymer can contain about 12 to 14 weight percent of vinyl acetate or alternatively, the copolymer can be a graft copolymer of an unsaturated, fused ring, carboxylic acid anhydride upon high density polyethylene.

Additionally, this reference teaches that the polybutylene employed in making the heat sealable resin blend is a flexible, crystalline isotactic polymer having a density of about 0.91 and a melt index of about 0.4 to 20; most desirably, a melt index of about 1.0.

Other references teach heat sealable packaging films, such as for food stuffs which include 20 to 40 percent by weight of polybutene-1 and about 80 to 60 percent by weight of an ethylene/vinyl acetate copolymer consisting essentially of about from 5 to 28 percent vinyl acetate; see U.S. Pat. No. 3,817,821.

A variety of other references teach heat sealable films capable of forming peel seals, such as U.S. Pat. Nos. 4,550,141; 4,539,263; 4,414,053 and 3,879,492. However, none of these references appear to teach a method of blending the separate tie layer with the components of the film forming an intimate packaging film structure, without the equipment needed to dispose the tie layer adhesive on the substrate. The instant invention teaches a method of blending the separate tie layer adhesive with the components of the film such that the equipment needed to dispose the tie layer adhesive on the substrate is no longer necessary. The instant invention recognizes that conventional multilayer peelable seal films or sheets are comprised of substrates and peelable sealants which are generally not chemically compatible and is a novel blend, and method of making a film which creates chemically compatible substrates and peelable sealants. The instant invention avoids delamination layers when the sealed layers are pulled apart and utilizes a tie adhesive to bind incompatible substrates with sealants without the need for additional equipment to bind the adhesive between the sealant and the substrate. The novel and inventive method reduces manufacturing costs for producing peelable seals.

A need has long existed for a blend which can be used to make a peelable seal which can be blended with the tie layer adhesive of the film prior to extrusion, thereby reducing the cost for making easy opening peelable seals.

The present invention which teaches a blend of polybutylene, polypropylene and modified EVA, a blend of polybutylene, polypropylene and modified low density polyethylene and a blend of polybutylene and modified low density polyethylene meets this need.

SUMMARY OF THE INVENTION

A new composition of matter for producing a peelable heat seal between substrates on which it is carried, comprising a blend of:

(a) about 6 to about 25 weight percent of polybutylene having a melt index of about 0.1 to about 500;

(b) about 2 to about 15 weight percent of polypropylene; and (c) about 60 to about 92 weight percent of modified EVA; and wherein said blend, when coated onto nylon at a heat sealing temperature of between about 320° F. and about 410° F. as determined at sealing jaws, affords a peel strength of between about 0.4 to about 5 pounds per inch between blend layers heat sealed at said heat sealing temperatures.

A new composition of matter for producing a peelable heat seal between substrates on which it is carried, comprising a blend of:

(a) about 6 to about 25 weight percent of polybutylene having a melt index of about 0.1 to about 500;

(b) about 3 to about 15 weight percent of polypropylene; and (c) about 60 to about 91 weight percent of modified low density polyethylene; and wherein said blend, when coated onto nylon at a heat sealing temperature of between about 320° F. and about 410° F. as determined at sealing jaws, affords a peel strength of between about 1.5 to about 5 pounds per inch between blend layers heat sealed at said heat sealing temperatures.

A new composition of matter for producing a peelable heat seal between substrates on which it is carried, comprising a blend of:

(a) about 6 to about 25 weight percent of polybutylene having a melt index of about 0.1 to about 500; and (b) about 75 to about 94 weight percent of modified low density polyethylene; and wherein said blend, when coated onto nylon at a heat sealing temperature of between about 320° F. and about 410° F. as determined at sealing jaws, affords a peel strength of about 1.5 to about 5 pounds per inch between blend layers heat sealed at said heat sealing temperatures.

A new composition of matter for producing a peelable heat seal between substrates on which it is carried, comprising a blend of:

(a) about 8 to about 25 weight percent of polybutylene having a melt index of between about 0.1 to about 500; and (b) about 2 to about 15 weight percent of polypropylene; and (c) about 60 to about 90 weight percent of modified EVA; and wherein said blend, when coated onto polycarbonate at a heat sealing temperature of between about 250° F. and about 330° F. between the blend layers as determined at the sealing jaws, affords a peel strength in the range of about 0.3 and about 9 pounds per inch between blend layers heat sealed at said heat sealing temperatures.

A new composition of matter for producing a peelable heat seal between substrates on which it is carried, comprising a blend of:

(a) about 8 to about 25 weight percent of polybutylene having a melt index of between about 0.1 and about 500; and (b) about 2 to about 15 weight percent of polypropylene; and (c) about 60 to about 90 weight percent of modified low density polyethylene; and wherein said blend, when coated onto polycarbonate at a heat sealing temperature of between about 250° F. and about 330° F. between the blend layers as determined at sealing jaws, affords a peel strength in the range of about 0.3 and about 9 pounds per inch between blend layers heat sealed at said heat sealing temperatures.

A new composition of matter for producing a peelable heat seal between substrates on which it is carried, comprising a blend of:

(a) about 8 to about 25 weight percent of polybutylene having a melt index of between about 0.1 and about 500; and (b) about 75 to about 92 weight percent of modified low density polyethylene; and wherein said blend, when coated onto polycarbonate at a heat sealing temperature of between about 250° F. and about 330° F. between blend layers as determined at sealing jaws, affords a peel strength in the range of about 0.3 and about 9 pounds per inch between blend layers heat sealed at said heat sealing temperatures.

A film adapted for producing a peelable heat seal, said film being a coextrudate of a nylon and a heat sealing blend, said blend comprising:

(a) about 6 to about 25 weight percent of polybutylene having a melt index of about 0.1 to about 500; and (b) about 2 to about 15 weight percent of polypropylene; and (c) about 60 to about 92 weight percent of modified EVA; and wherein said film has utility for achieving a peel strength of between about 0.4 pounds to about 5 pounds per inch between film layers when heat sealing occurs at a temperature in the range between about 320° F. and about 410° F. as determined at the sealing jaws.

A film adapted for producing a peelable heat seal, said film being a coextrudate of a nylon and a heat sealing blend, said blend comprising:

(a) about 6 to about 25 weight percent of polybutylene having a melt index of about 0.1 to about 500; and (b) about 75 to about 94 weight percent of a tie layer adhesive comprising modified low density polyethylene; and wherein said film has utility for achieving a peel strength over at least 1.5 pounds per inch between film layers when heat sealing occurs at a temperature in the range between about 320° F. and about 410° F. as determined at the sealing jaws.

A film adapted for producing a peelable heat seal, said film being a coextrudate of a nylon and a heat sealing blend, said blend comprising:

(a) about 6 to about 25 weight percent of polybutylene having a melt index of about 0.1 to about 500; and (b) about 3 to about 15 weight percent of polypropylene; and (c) about 60 to about 91 weight percent of modified low density polyethylene; and wherein said film has utility for achieving a peel strength of between about 0.4 pounds to about 5 pounds per inch between film layers when heat sealing occurs at a temperature in the range between about 320° F. and about 410° F. as determined at the sealing jaws.

A film adapted for producing a peelable heat seal, said film being a coextrudate of a polycarbonate and a heat sealing blend, said blend comprising:

(a) about 8 to about 25 weight percent of polybutylene having a melt index of about 0.1 to about 500; and (b) about 2 to about 15 weight percent of polypropylene; and (c) about 60 to about 90 weight percent of modified EVA; and wherein said film has utility for achieving a peel strength of between about 0.3 pounds to about 9 pounds per inch between film layers when heat sealing occurs at a temperature in the range between about 250° F. and about 330° F. as determined at the sealing jaws.

A film adapted for producing a peelable heat seal, said film being a coextrudate of a polycarbonate and a heat sealing blend, said blend comprising:

(a) about 8 to about 25 weight percent of polybutylene having a melt index of about 0.1 to about 500; and (b) about 75 to about 92 weight percent of a tie layer adhesive comprising modified low density polyethylene; and wherein said film has utility for achieving a peel strength in the range of about 0.3 and about 9 pounds per inch between film layers when heat sealing occurs at a temperature in the range between about 250° F. and about 330° F. as determined at the sealing jaws.

A film adapted for producing a peelable heat seal, said film being a coextrudate of a polycarbonate and a heat sealing blend, said blend comprising:

(a) about 8 to about 25 weight percent of polybutylene having a melt index of about 0.1 to about 500; and (b) about 2 to about 15 weight percent of polypropylene; and (c) about 60 to about 90 weight percent of modified low density polyethylene; and wherein said film has utility for achieving a peel strength in the range of about 0.3 pounds and about 9 pounds per inch between film layers when heat sealing occurs at a temperature in the range between about 250° F. and about 330° F. as determined at the sealing jaws between blend layers heat sealed at said heat sealing temperatures.

DETAILED DESCRIPTION OF THE INVENTION

Since the following terms will be used throughout the specification particular definitions are now provided:

The term "polybutylene" refers to polymers of butene-1 homopolymer and butene-1 copolymers such as butene-1-ethylene and butene-1-propylene.

The term "polypropylene" refers to polymers derived from propylene, commonly represented as $CH_3-CH=CH$.

The term "polyethylene" refers to polymers derived from ethylene commonly represented as CH2=CH2 or ethylene-α-olefin copolymers where α-olefin has carbon atoms of 4 to 12.

The term "EVA" refers to copolymers of ethylene with vinyl acetate.

The term "modified EVA" refers to commercialized adhesives such as Plexar ®-type modified EVA materials made by Norchem Inc., Rolling Meadows, Illinois, and Admer-type modified EVA materials made by Mitsui Petrochemical Industries, Ltd., Tokyo, Japan. Plexar ® resins were formerly commercially available from Chemplex Company (now called Norchem) and are described in U.S. Pat. Nos. 4,087,587 and 4,087,588. These modified EVA or low density polyethylene resins are generally extrudable polyolefin adhesives and are capable of bonding two dissimilar materials.

The term "modified low density polyethylene" refers to a resin such as Plexar ® polyethylenes or Admer polyethylene, with a melt index in the range of about 1 to about 5, and in particular about 1.7, and a density in the range of from about 0.91 g/cc to about 0.93 g/cc, and preferably 0.92 g/cc.

The term "tie layer adhesive" refers to the substance which is applied between the substrate and the peelable sealants to bind the peelable sealants to a substrate, such as nylon or polycarbonate. Typical tie layer adhesives include modified EVA or modified low density polyethylene.

The term "extrudate" refers to the substance which has been forced through the die of the extruder.

The term "peelable heat seal" refers to seals between two areas which are joined when heat is applied to the area and the areas can be peeled off from one another when stress is applied without tearing or shredding each area.

The term "peel sealability" refers to the sealed area of a film where the two parts are joined together. A film's peel sealability is measured by the degree of strength applied, such sealability can be measured by ASTM tensile strength testing method D-882.

The term "film" refers to a synthetic resinous material having both an upper layer (comprising a blend of the tie layer adhesive and sealant) and a lower layer (comprising the substrate material), and is capable of being disposed about a product or entity to enclose it therein.

The composition of the polybutylene employed herein is preferably of a film-forming grade, and can be obtained commercially from the Shell Chemical Company or prepared as described in U.S. Pat. No. 3,362,940. Preferably, the polybutylene has a melt index in the range of about 0.1 to about 500, and more preferably in the range of about 0.4 to about 7. More preferably, the polybutylene has a melt index of about 1 to about 4. Most preferably, the polybutylene has a melt index of 2±0.5.

While the ethylenically-unsaturated ester of the copolymer employed may be any which will result in a blend having the characteristics described above, vinyl acetate and methyl acrylate are preferred. A possible alternative copolymer is ethyl acrylate. The amount of the ester moiety will determine to an extent, the optimal heat sealing temperature and the processing characteristics of the blend, which therefore represents practical constraints upon the resin compositions.

The resultant film article can be prepared by any suitable means, such as heat lamination or coextrusion. Coextrusion techniques that can be used for the preparation of the instant film include those described in detail in U.S. Pat. No. 2,480,998.

Exemplary of the efficacy of the present invention are the followiong examples. As will become evident from the examples, the blends of the present invention will produce seals having a nearly constant peel strength over extended heat seal temperature ranges.

EXAMPLE I

Polybutylene (Shell Chemical Co. Duraflex ® PB 8240) having a melt index of about 2 (ASTM D-1238 Condition "E") and a density of about 0.901 g/cc was dry blended in a tumble mixer with polypropylene (Shell Chemical Co. PP 5820) and one of several heat sealable copolymers, modified EVA (Note: polybutylene may be melt blended with polypropylene first and the resultant compound can be dry blended with the said modified EVA). The resultant blend was coextruded at a die temperature of about 420° Farenheit (°F.) with a Nylon 6 as substrate (available from Allied Chemical Co.) through a slot die into a form so as to produce a cast film, about 4.75 mils thick, with the resin blend (See Table 1 for formulation) consisting of about 29 percent of its thickness as the peelable seal layer. After cooling, opposite sides of the samples were then heat sealed together with the resin blend layers in face-to-face contact, using 40 pounds per square inch of pressure and a dwell time of about half a second. After sealing, one-inch wide strips were cut from the film at locations across its width. These samples of the film were sealed at each of several jaw temperatures, and then were subjected to peel strength analysis by pulling across the seal, using a commercial tensile testing device at a 10'/min crosshead speed. Table 1 sets forth the results observed:

TABLE 1

| Type of Substrate | Peel Seal Blends Formulation | Sealing Temp. (°F.) | Peel Strength (pounds)/in |
|---|---|---|---|
| Nylon 6 | Modified EVA + 6% PB 8240 + 5% PP 5820 | 330 | 0.6 |
|  |  | 350 | 2.4 |
|  |  | 370 | 3.5 |
|  |  | 400 | 3.8 |
| Nylon 6 | Modified EVA + 8% PB 8240 + 5% PP 5820 | 330 | 0.5 |
|  |  | 350 | 1.8 |
|  |  | 370 | 2.75 |
|  |  | 400 | 3.1 |
| Nylon 6 | Modified EVA + 10% PB 8240 + 5% PP 5820 | 330 | 0.4 |
|  |  | 350 | 1.3 |
|  |  | 370 | 1.9 |
|  |  | 400 | 2.4 |

NOTE:
Nylon 6 is Allied Chemical Co.'s Capron 8209 F.
Modified EVA is Norchem's Plexar 3 with vinyl acetate content = 9% and MI = 3.0 dg/min.
PB 8240 is Shell Chemical Co.'s Duraflex ® polybutylene at MI = 2.0 dg/min tested at 190° C.
PP 5820 is Shell Chemical Co.'s polypropylene at Melt flow = 12 dg/min tested at 230° C.

The peel strength set forth for each temperature represents the average of the values obtained for the samples tested.

EXAMPLE II

Example I was substantially repeated, except the substrate was changed from Nylon 6 to polycarbonate and the modified EVA in the peel seal blend cited in Table 2 is Plexar ® 326. Plexar ® 326 is essentially a modified ethylene-vinyl acetate copolymer. Table 2 also shows the results of peel seal test.

TABLE 2

| Substrate | Peel Seal Blend Formulation | Sealing Temp. (°F.) | Peel Seal Strength (pounds)/in |
| --- | --- | --- | --- |
| Polycarbonate | Modified EVA + 8% PB 8240 + 5% PP 5820 | 260 280 300 320 | 3.0 6.4 8.0 8.5 |
| Polycarbonate | Modified EVA + 10% PB 8240 + 5% PP 5820 | 260 280 300 320 | 3.0 6.2 8.1 9.0 |
| Polycarbonate | Modified EVA + 15% PB 8240 + PP 5820 | 260 280 300 320 | 0.3 0.7 0.9 1.2 |

NOTE:
Polycarbonate is GE's Lexan ® J 6862.
Modified EVA is Norchem's Plexar ® 326 at MI = 3.5 dg/min and with a high vinyl acetate content.
PB 8240 is Shell Chemical Co.'s Duraflex ® polybutylene at MI = 2.0 dg/min tested at 190° C.
PP 5820 is Shell Chemical Co.'s polypropylene at melt flow = 12 dg/min tested at 230° C.

What is claimed is:

1. A film adapted for producing a peelable heat seal, said film being a coextrudate of a polycarbonate and a heat sealing blend, said blend comprising:
    (a) about 8 to about 25 weight percent of a member of the group consisting of butene-1 homopolymer, butene-1-ethylene copolymer and butene-1-propylene copolymer having a melt index of about 0.1 to about 500; and
    (b) about 2 to about 15 weight percent of polypropylene; and
    (c) about 60 to about 92 weight percent of modified EVA; and wherein
said film has utility for achieving a peel strength of between about 0.3 pounds to about 9 pounds per inch between film layers when heat sealing occurs at a temperature in the range between about 250° F. and about 330° F. as determined at the sealing jaws.

2. The film of claim 1, comprising about 10 to about 20 weight percent of said member of the group consisting of butene-1 homopolymer, butene-1-ethylene copolymer and butene-1-propylene copolymer, about 3 to about 10 weight percent of said polypropylene, and about 70 to about 87 weight percent of modified EVA.

3. The film of claim 2, wherein said heat sealing temperature is between about 280° F. and about 320° F. and said peel strength is between about 1.0 and about 8 pounds per inch.

4. A film adapted for producing a peelable heat seal, said film being a coextrudate of a polycarbonate and a heat sealing blend, said blend comprising:
    (a) about 8 to about 25 weight percent of a member of the group consisting of butene-1 homopolymer, butene-1-ethylene copolymer and butene-1-propylene copolymer having a melt index of about 0.1 to about 500; and
    (b) about 75 to about 92 weight percent of a tie layer adhesive comprising modified low density polyethylene; and wherein
said film has utility for achieving a peel strength in the range of about 0.3 and about 9 pounds per inch between film layers when heat sealing occurs at a temperature in the range between about 250° F. and about 330° F. as determined at the sealing jaws.

5. The film of claim 4, comprising about 10 to about 20 weight percent of said member of the group consisting of butene-1 homopolymer, butene-1-ethylene copolymer and butene-1 propylene copolymer about 3 to about 10 weight percent of said polypropylene and about 70 to about 87 weight percent of modified low density polyethylene.

6. The film of claim 5, wherein said heat sealing temperature is between about 280° F. and about 320° F. and said peel strength is between about 1.0 and about 8 pounds per inch.

7. A film adapted for producing a peelable heat seal, said film being a coextrudate of a polycarbonate and a heat sealing blend, said blend comprising:
    (a) about 8 to about 25 weight percent of a member of the group consisting of butene-1 homopolymer, butene-1-ethylene copolymer and butene-1-propylene copolymer having a melt index of about 0.1 to about 500; and
    (b) about 2 to about 15 weight percent of polypropylene; and
    (c) about 60 to about 90 weight percent of modified low density polyethylene; and wherein
said film has utility for achieving a peel strength in the range of about 0.3 pounds and about 9 pounds per inch between film layers when heat sealing occurs at a temperature in the range between about 250° F. and about 330° F. as determined at the sealing jaws.

8. The film of claim 7, comprising about 10 to about 20 weight percent of said member of the group consisting of butene-1 homopolymer, butene-1-ethylene copolymer and butene-1-propylene copolymer and about 80 to about 90 weight percent of said modified low density polyethylene.

9. The film of claim 8, wherein said heat sealing temperature is between about 280° F. and about 320° F. and said peel strength is between about 1.0 and about 8 pounds per inch.

10. A film adapted for producing a peelable heat seal, said film being a coextrudate of a nylon and a heat sealing blend, said blend comprising:
    (a) about 6 to about 25 weight percent of a member of the group consisting of butene-1 homopolymer, butene-1-ethylene copolymer and butene-1-propylene copolymer having a melt index of about 0.1 to about 500; and
    (b) about 2 to about 15 weight percent of polypropylene; and
    (c) about 60 to about 92 weight percent of modified EVA; and wherein
said film has utility for achieving a peel strength of between about 0.4 pounds to about 5 pounds per inch between film layers when heat sealing occurs at a temperature in the range between about 320° F. and about 410° F. as determined at the sealing jaws.

11. The film of claim 10, comprising about 8 to about 20 weight percent of said member of the group consisting of butene-1 homopolymer, butene-1-ethylene copolymer and butene-1-propylene copolymer, about 3 to about 10 weight percent of said polypropylene and about 70 to about 89 weight percent of said modified EVA.

12. The film of claim 11, wherein said heat sealing temperature is between about 350° F. and about 400° F., and said peel strength is between about 1.0 and about 3.2 pounds per inch.

13. A film adapted for producing a peelable heat seal, said film being a coextrudate of a nylon and a heat sealing blend, said blend comprising:
 (a) about 6 to about 25 weight percent of a member of the group consisting of butene-1 homopolymer, butene-1-ethylene copolymer and butene-1-propylene copolymer having a melt index of about 0.1 to about 500; and
 (b) about 75 to about 94 weight percent of a tie layer adhesive comprising modified low density polyethylene; and wherein
said film has utility for achieving a peel strength of between about 1.5 pounds to about 5 pounds per inch between film layers when heat sealing occurs at a temperature in the range between about 320° F. and about 410° F. as determined at the sealing jaws.

14. The film of claim 13, comprising about 8 to about 20 weight percent of said member of the group consisting of butene-1 homopolymer, butene-1-ethylene and butene-1-propylene copolymers and about 80 to about 92 weight percent of said modified low density polyethylene.

15. The film of claim 14, wherein said heat sealing temperature is between about 350° F. and about 400° F., and said peel strength is between about 1.8 and about 3.2 pounds per inch.

16. A film adapted for producing a peelable heat seal, said film being a coextrudate of a nylon and a heat sealing blend, said blend comprising:
 (a) about 6 to about 25 weight percent of a member of the group consisting of butene-1 homopolymer, butene-1-ethylene copolymer and butene-1-propylene copolymer having a melt index of about 0.1 to about 500; and
 (b) about 3 to about 15 weight percent of polypropylene; and
 (c) about 60 to about 91 weight percent of modified low density polyethylene; and wherein
said film has utility for achieving a peel strength of between about 0.4 pounds to about 5 pounds per inch between film layers when heat sealing occurs at a temperature in the range between about 320° F. and about 410° F. as determined at the sealing jaws.

17. The film of claim 16, comprising about 8 to about 20 weight percent of said member of the group consisting of butene-1 homopolymer, butene-1-ethylene copolymer and butene-1-propylene copolymer and about 3 to about 10 weight percent of said polypropylene and about 70 to about 89 weight percent of said modified low density polyethylene.

18. The film of claim 17, wherein said heat sealing temperature is between about 350° F. and about 400° F., and said peel strength is between about 1.8 and about 3.2 pounds per inch.

* * * * *